US011152005B2

(12) United States Patent
Macallum (10) Patent No.: US 11,152,005 B2
(45) Date of Patent: Oct. 19, 2021

(54) PARALLEL PROCESSING FRAMEWORK FOR VOICE TO TEXT DIGITAL MEDIA

(71) Applicant: VIQ Solutions Inc., Mississauga (CA)

(72) Inventor: Malcolm Macallum, Milton (CA)

(73) Assignee: VIQ Solutions Inc., Mississauga (CA)

( * ) Notice: Subject to any disclaimer, the term of this patent is extended or adjusted under 35 U.S.C. 154(b) by 77 days.

(21) Appl. No.: 16/567,143

(22) Filed: Sep. 11, 2019

(65) Prior Publication Data

US 2021/0074300 A1    Mar. 11, 2021

(51) Int. Cl.
*G10L 17/00* (2013.01)
*G10L 25/63* (2013.01)

(52) U.S. Cl.
CPC .............. *G10L 17/00* (2013.01); *G10L 25/63* (2013.01)

(58) Field of Classification Search
CPC ......... G10L 17/00; G10L 25/63; G10L 15/32; G10L 2021/02087; G10L 21/0208; G10L 15/01; G10L 21/0272
See application file for complete search history.

(56) References Cited

U.S. PATENT DOCUMENTS

| | | | | |
|---|---|---|---|---|
| 6,477,500 B2 * | 11/2002 | Maes | .................... | G10L 15/065 704/246 |
| 6,665,644 B1 * | 12/2003 | Kanevsky | ............... | G10L 17/26 704/246 |
| 2011/0264451 A1 * | 10/2011 | Hoepfinger | ........... | G10L 15/063 704/235 |
| 2013/0311184 A1 * | 11/2013 | Badavne | ................. | G10L 15/07 704/250 |
| 2014/0129218 A1 * | 5/2014 | Liu | ......................... | G10L 15/32 704/231 |
| 2016/0140964 A1 * | 5/2016 | Connell, II | ............. | G10L 15/07 704/231 |
| 2018/0114288 A1 * | 4/2018 | Aldaz | .................... | G06Q 10/10 |
| 2019/0392837 A1 * | 12/2019 | Jung | ....................... | G06F 3/167 |
| 2020/0349950 A1 * | 11/2020 | Yoshioka | .............. | G10L 15/083 |

* cited by examiner

*Primary Examiner* — Huyen X Vo
(74) *Attorney, Agent, or Firm* — Jeffri A. Kaminski; Venable LLP (57) ABSTRACT

A method of converting speech to text comprises receiving an audio recording from an input device comprising speech of a plurality of speakers. Extracting from the audio recording, a speaker audio recording comprising recorded audio of an individual speaker. Selecting, based on a characteristic of the speaker audio recording, a speech to text engine and a dictionary. Configuring the speech to text engine with the dictionary and executing a first conversion process to convert a first portion of the speaker audio recording to produce a first transcript. Evaluating a performance metric of the conversion process against a quality metric to reconfigure the speech to text engine and execute a second conversion process to convert a second portion of the speaker audio recording to produce a second transcript. Combining the first transcript and the second transcript to produce a transcript of the speaker audio recording.

16 Claims, 5 Drawing Sheets

PARALLEL PROCESSING FRAMEWORK FOR VOICE TO TEXT DIGITAL MEDIA

FIELD OF THE INVENTION

The present invention relates to the field of voice to text processing. More particularly, it relates to the use of for the processing of audio/visual recordings into text transcripts.

DESCRIPTION OF RELATED ART

There are many applications that require the conversion of speech recordings to a text transcript. A common example is the work of a court stenographer who transcribes the spoken proceedings or a recording of the proceedings into a text record of the proceedings. Other examples may include recordings of police conversations, insurance agents, customer service agents, and others.

Traditionally, producing a transcript was done by a person who would listen to the conversation or a recording and write or type the words. This is a very labor-intensive task and time consuming. In more recent times software has been developed to aid in the transcription and commercial, speech recognition has been developed. Some of these software packages utilize neural net or artificial intelligence techniques which can offer performance or accuracy benefits for transcription application.

AI is the implementation of computer-based solutions that aim to simulate human intelligence. This is often coupled with the use of machine learning, where the computer adapts or "learns" based on past experience. However, speech to text tools have narrow functionality and there is often a trade-off between general tools vs. specific tools that are optimized for a specific application. It is difficult to build a single tool that produces a desired outcome for complex problems such as speech to text transcription.

There are several challenges for audio to text transcriptions. There is the issue of different languages, dialects, and accents. There are industry specific terms and vocabulary that may not be used outside of these industries or may have a specific meaning in a particular industry. These applications also require the ability to analyze speech for context in order to correctly identify homophones correctly. An additional challenge is dealing with an environment with multiple speakers or multiple microphones.

Transcribing speech can be very computer intensive especially when a level of speed and accuracy is required to be a feasible replacement for existing systems. A useful speech to text system includes a framework that is able to scale performance to reliably process millions of results within a known time limit. Also, that the system be able to continue operating when faced with a problem or failure during processing.

Modern applications utilize frameworks to combine multiple tools and configure sequential and parallel processing steps to achieve a desired outcome. However, these models process models for specific use cases and require hand coded routing through each step in the solution path. Building each solution path is a linear process and the problem becomes exponentially more complex when handling multiple parallel interdependent solution paths. The hand coded solution become difficult to manage and when the process is scaled to thousands of servers, becomes almost impossible to manage.

There exists a need for a framework and processing engine that is flexible, reconfigurable, scalable, and can utilize models while being customized to specific real-world applications.

BRIEF SUMMARY

It is an object of the present invention to mitigate limitations within the prior art relating to the field of voice to text processing. More particularly, it relates to the use of some techniques for the processing of audio/visual recordings into text transcripts.

One aspect of this invention is a method of converting speech to text comprises receiving an audio recording from an input device. The audio recording comprises the speech of a plurality of speakers. Extracting from the audio recording, a speaker audio recording comprising recorded audio of an individual speaker. Selecting, based on a characteristic of the speaker audio recording, a speech to text engine and a dictionary. Configuring the speech to text engine with the dictionary and executing a first conversion process to convert a first portion of the speaker audio recording to produce a first transcript. Evaluating a performance metric of the conversion process against a quality metric to reconfigure the speech to text engine and execute a second conversion process to convert a second portion of the speaker audio recording to produce a second transcript.

Further embodiments comprise combining the first transcript and the second transcript to produce a transcript of the speaker audio recording.

In some embodiments, reconfiguring the speech to text engine comprises replacing the speech to text engine with a different speech to text engine. In other embodiment, reconfiguring the speech to text engine comprises replacing the dictionary with a different dictionary.

In some embodiments, the characteristic of the speaker audio recording comprises a language. In other embodiment, the characteristic of the speaker audio recording comprises a language accent. In further embodiments, the characteristic of the speaker audio recording comprises an industry specific lexicon.

Further embodiments comprise extracting from the audio recording, a second speaker audio recording comprising recorded audio of a second speaker, executing a second conversion process to convert the second speaker audio recording to produce a third transcript, and parsing the first transcript, the second transcript, and the third transcript so that a transcript of the individual speaker and the second speaker are in chronological order.

In some embodiments, the second conversion process utilizes a second speech to text engine and a second dictionary selected based on a characteristic of second speaker audio recording.

In other embodiments, the characteristic of the speaker audio recording comprises a word or phrase used by the individual speaker.

In some embodiments, the quality metric is a latency between receiving the audio recording and producing the first transcript. In other embodiments, the quality metric is a number of misidentified words. In some embodiments, the number of misidentified words comprise homophones.

In other embodiments, reconfiguring of the text engine comprises configuring a plurality of parallel processes for executing the second conversion process.

In some embodiments, the performance metric comprises a result of a review of the first transcript by a stenographer.

In further embodiments, the first transcript comprises an indication of the emotional state of the individual speaker.

In some embodiments, the characteristic of the speaker audio recording allows for the identification of an identification of the individual speaker.

In other embodiments, the identification of the individual speaker is used to select the speech to text engine or the dictionary.

Other aspects and features of the present invention will become apparent to those ordinarily skilled in the art upon review of the following description of specific embodiments of the invention in conjunction with the accompanying figures.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present disclosure relates to the field of voice to text processing in computer science. More particularly, it relates to a framework of multiple objects that can be configured and dynamically reconfigured with sequential and parallel routing in order to produce speech to text transcription of a recording object that meet quality of service requirements for a variety of applications.

One exemplary application addresses a need to produce accurate, market-specific speech-to-text draft documents for evidentiary purposes. To do that it must be able to combine multiple tools and configure sequential and parallel processing steps to achieve a fast and accurate text draft based on audio speech recordings.

A framework is a combination of objects, structures, computing resources and logic algorithms that provide a variable demand driven number of machines to produce an outcome based on specific inputs. These include a routing engine, a task manager, a scaling manager, error engine, and service level interpreter. Collectively these elements form a framework that allows for complex analyses to occur in a few seconds and more importantly provides a feedback loop that permits the system to learn the best performance criteria.

Based on the metadata presented when the recording object enters the framework, the framework determines, schedules and combines all of the resources needed to execute the processing strategy required to deliver the desired result.

AI objects may be functional nodes that are standalone objects but can be called in specific sequences. They may be cascaded in linear and parallel in order to deliver a desired processing outcome. Each object comprises an input queue, a service level assessment capability, and a micro service-based logic.

The routing engine utilizes routing logic that defines the sequential and parallel paths that link objects. The routing logic is defined as a logical Boolean expression which becomes part of the metadata of the recording.

Speech to text recording objects can be classified in a number of ways. It can be by location, language, industry, person, word, etc. or may be viewed as an individual object. As each type of object is run through the framework, data describing aspects of the resolution path is fed back into the system. This allows the system to "learn" from prior trials the most efficient and effective path to a resolution. The framework can also dynamically adjust the routing of the recording object based on findings in the early stages of processing. The same recording object may be run or partially run multiple times in order to obtain results that meet service level targets.

For each engine, the service level interpreter can determine a conversion quality using a combination of internal logic and metadata attached to the recording object. Speech to text conversions for that results in a quality that falls below predetermined limits is cast as an error and is analyzed by the error engine. This cycle also feeds back to the "learn" engine which takes into account these errors in the next attempt. A new routing path is calculate based on the error analysis of the previous solution attempted.

When the quality of a conversion is found to be inadequate, the system can adapt in a number of ways. it can replace the speech to text engine with another one, it can remove or add dictionaries. A language dictionary may be changed from two similar languages such as Swedish, Norwegian, and Danish. A dialect or accent dictionary may be changed. For example, between English, Irish, and Australian. An industry specific lexicon dictionary may be changed. For example, between a judge, a police officer, and a lay person.

All processing that is completed on the recording object is appended to an audit log that is stored as an attribute of the recording object. As data inputs are entered and solutions found all meta-data associated with that run are collected and also stored in the audit log. As the routing steps proceed these can be dynamically changed based on metadata analyses. This provides for "learning" which routes are successful and which nodes (machines) are available. This step is critical because the routing solutions are managing millions of objects, machines and paths. Therefore, the meta data content of each recording object expands at each processing step.

The routing steps for each recording object can be dynamically changed based on incremental changes in the metadata. For example, conditional events can change the routing logic.

A centrally controlling task manager oversees all transactions, status of all submitted jobs based on meta-data associated with the jobs and the status of routing paths. This together with the metadata provides a complete snapshot of recording object status and system status at any point in time. The progress of each recording object is tracked through the dynamic routing path. As a result of this system "state" any breakdown can be "rewound" to the last positive "state" and re-started from there. The combined information contained in the task manager and recording object metadata is sufficient to maintain full stateful awareness of all jobs in the system.

A scaling manager is designed which allows for scaling the processing nodes harnessed by measuring queue performance against predetermined standards which themselves can be changed as required. This technique allows for meeting certain preset timing conditions such that content can be analyzed, and results produced in acceptable timeframes. This is critical in achieving performance times that can meet customer and application expectations. The scaling manager may instantiate additional processing nodes if performance falls below the service levels encoded in the recording object's metadata.

Figure 1:
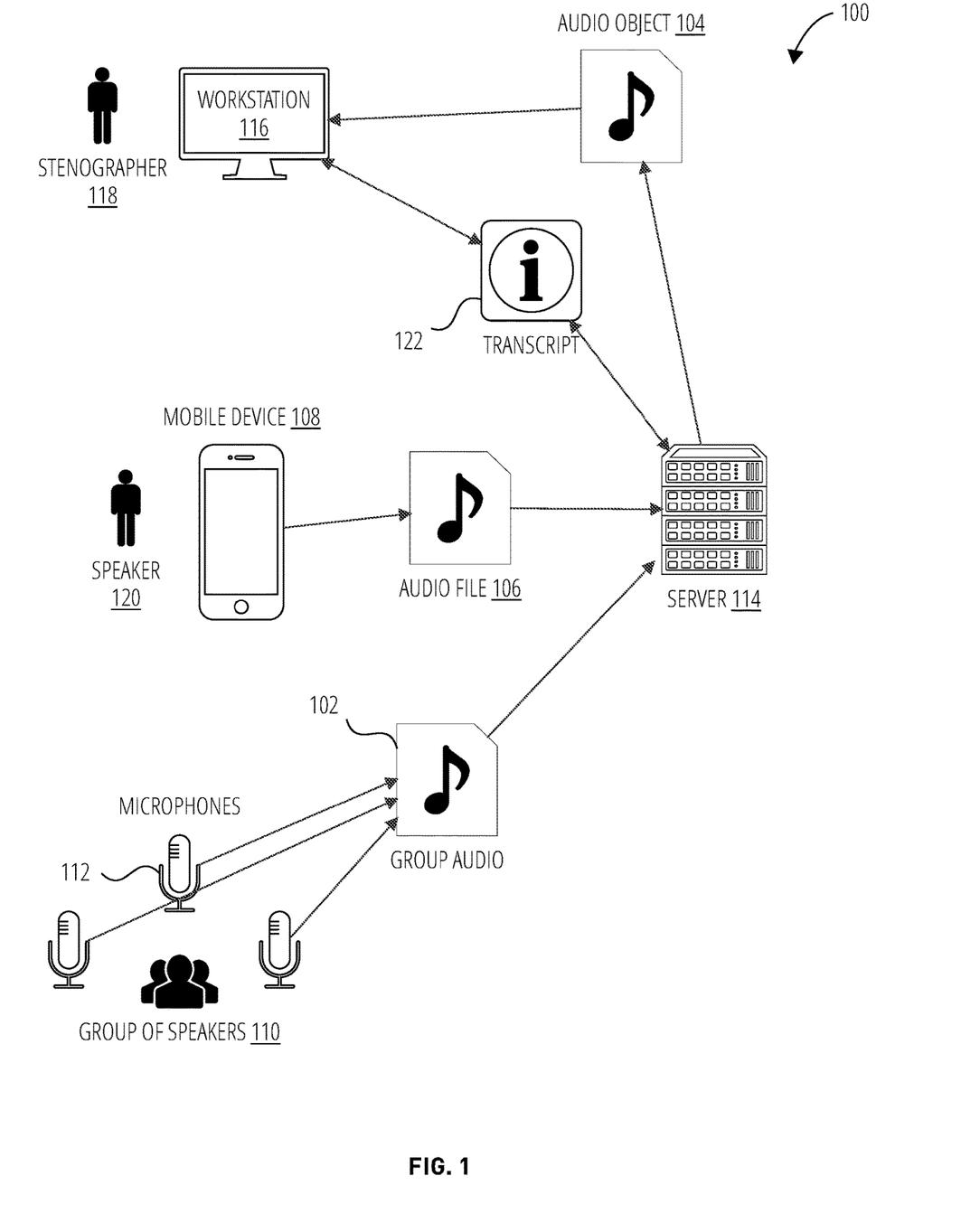
FIG. 1 illustrates a speech to text system 100 in accordance with one embodiment.

FIG. 1 illustrates a system according to an embodiment of the invention. Audio is recorded by custom hardware at one or several locations. In some locations a group of speakers 110 are in a location with several microphones 112, and associated recording and storage hardware, placed within the location. An example of this would be a courtroom where there may be dedicated microphones for key people such as the judge, witness, prosecutor, and defense council. Microphones may also be dedicated to specific audio channels. There may be other microphones to capture other voices in the room. When a person or multiple people speak, the microphones 112 will record the sound from several different locations with different sound levels for each of the various voices depending on a speaker's distance from each microphone, obstacles, ambient noise, and other factors. The recording hardware recorded by the microphones 112 will produce a group audio 102 file that is sent to a server 114. Other locations may be indoors or outdoors with a speaker or several speaker using a mobile device 108 or several mobile devices to record audio from people in the vicinity. An example of this may be a recording device built into a body camera of a police officer interacting with the public. The mobile device 108 will record an audio file 106 that is also sent to a server 114.

In most embodiments the original audio file will be encapsulated in an audio object 104 and have metadata attached to it. The audio object 104 will be stored and transmitted in a manner to preserve the veracity of the original recording. In some embodiments, the audio object 104 will be created at the point of recording. In other embodiments, it will be done by the server 114.

The server 114 may comprise any number of local, edge, central, or cloud servers. They may be dedicated servers or virtual server instances. They may be one or multiple servers in a single or multiple locations. The number of servers may be increased or decreased in order to meet service level targets and to ensure that the audio to text conversion is completed within determined time targets.

The text transcript may contain the text originating from a plurality of speakers. Though the speech to text processing for each speaker is likely to be optimized and processed separately, the final transcript will contain transcripts from all speakers of interest in chronological order.

If a particular person speaks at different times with long periods on not speaking in between, in some embodiments, these will result in different transcript files that will be combined in the final transcript. Similarly, if the error engine requires a change of speech to text engine or dictionary the resulting transcripts produced by different combinations of engines and dictionaries will be combined in the final transcript.

In some embodiments there will be audio speech that should not be part of the transcript. This may be background noise from an audience or the voice of someone who is not relevant to the required transcript. The system will detect and remove unwanted voices from the transcript.

The speech to text processing is performed by the server 114 and produces one or several transcript 122 files. An audio object 104 is also produced to allow for verification of the transcript 122 by a stenographer 118 using a workstation 116. The stenographer 118 utilized software running on the workstation 116 to verify the veracity of the transcript 122 with reference to the audio object 104. The amended transcript 122 may then be sent to the server 114 for storage and distribution to stakeholders.

In a real-world application a system may have multiple channels, multiple microphones, with multiple speech to text servers, instance, and processes in order to produce a transcript at a faster rate than a human stenographer could produce. In most cases the system will produce transcripts in less time than the running time of the audio.

Figure 2:
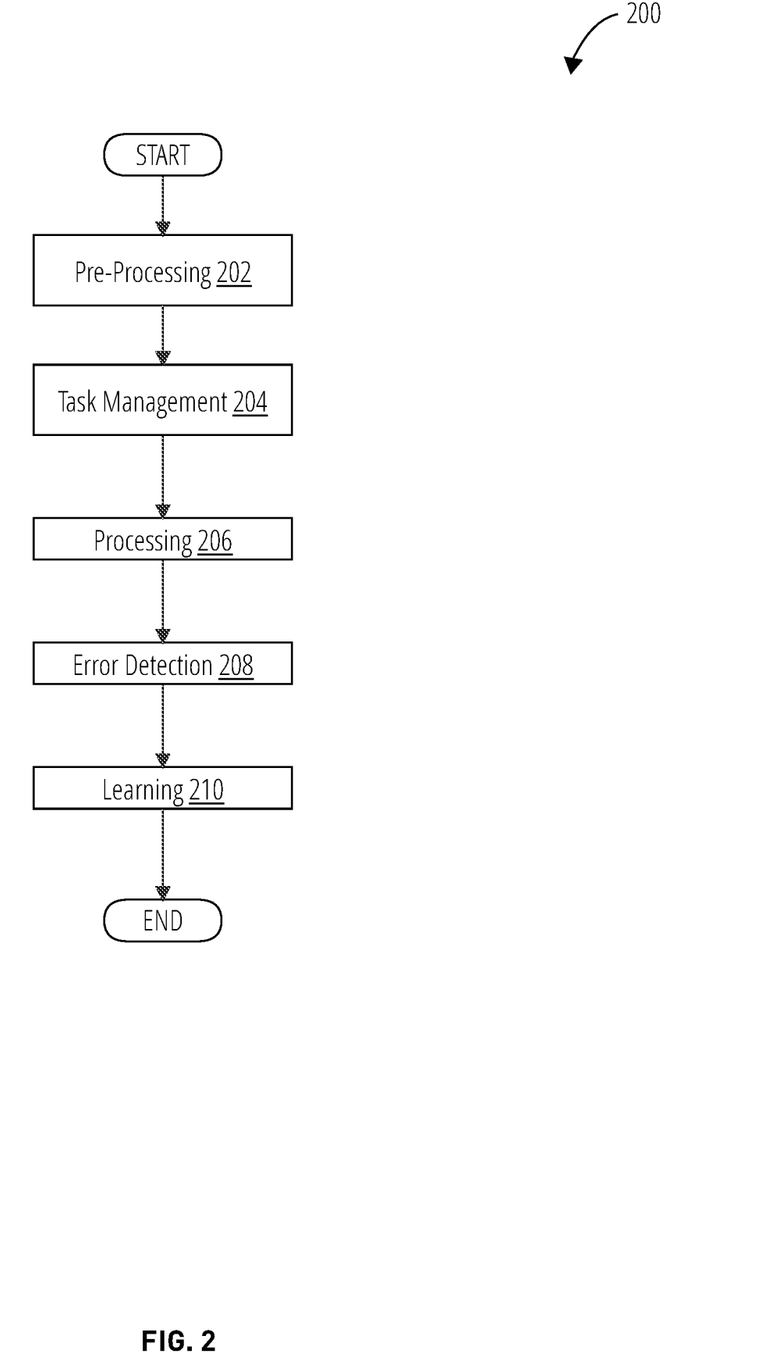
FIG. 2 illustrates a speech to text processing 200 in accordance with one embodiment.

FIG. 2 illustrates the speech to text processing 200. Pre-processing 202 comprises activities of dividing the audio found in the audio object into separate streams on a per channel basis. In some embodiments, each channel will correspond to a speaker. For each channel, the language or languages being spoken is detected, including regions dialects and accents. A dictionary or dictionaries are selected that include the relevant languages and also industry specific dictionaries. Examples of industry specific dictionaries include dictionaries for legal, military, police, insurance, academia and other fields that use specific words or use words in non-standard meanings. Once the characteristics of audio channels has been determined, commercial or proprietary speech recognition engines are selected to process each channel. The speech recognition engines may be configurable and the configuration options for each engine will be defined. Where metadata is available in the audio object, it may be used to select the various pre-processing 202 options.

Tasks are assigned by a task manager in order to ensure adequate processing resources for each channel. Error detection is performed by an error engine that detects if speech to text conversion does not meet service level requirements, if the conversion process consistently fails to accurately covert a particular word, and other error events. Error events are handled in different ways depending on the error detected. For example, long processing time can be alleviated by increasing the processing resources for that channel. Accuracy may be addressed by using different dictionaries.

Error detection is used as an input the learning process and can be automatic or manuals. Automatic error detection comprises the system will remember over time, optimal dictionaries for different locations, situations, and even for an individual speaker 120. The amount of processing power and parallelization that is required for particular application and channel will also be stored and used for initialization when recognition is done for a similar application or the same channel later.

Manual error detection involves a stenographer 118 or similar person or people reviewing transcriptions produced by the system while listening to the audio recordings. The system may aid the stenographer 118 by highlighting words that have a high probability of being in error and having them verify the transcription. The stenographer 118 has the ability to correct errors in the transcript and corrections are returned to the server 114 in order to train the system to increase accuracy. Repetitive errors on the same or similar words that exceed thresholds can trigger manual intervention to remedy the situation.

Figure 3:
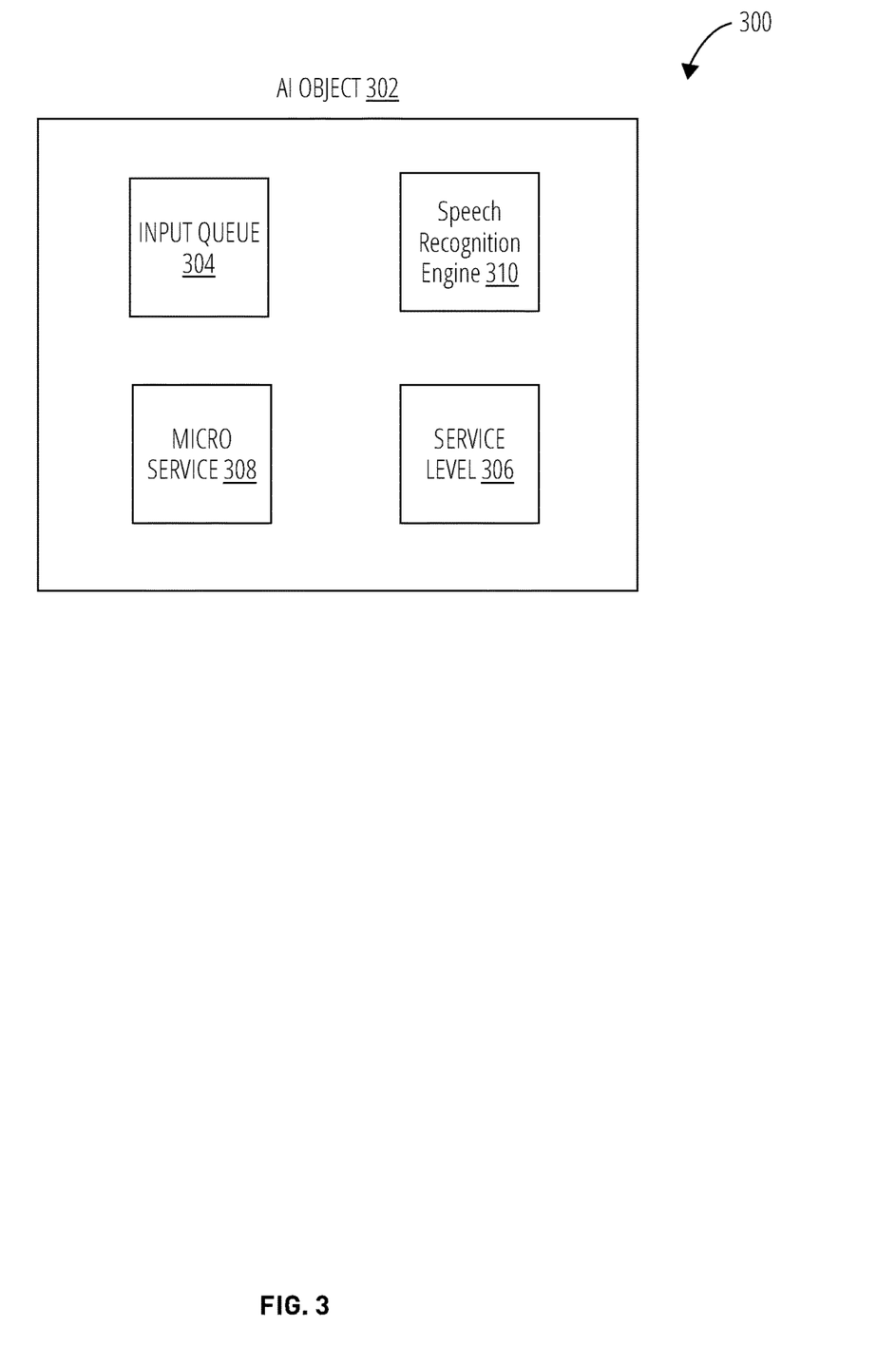
FIG. 3 illustrates an object and contents 300 in accordance with one embodiment.

An object wrapper is created for each engine. As illustrated in FIG. 3, the wrapper makes the speech recognition engine 310 an object 302 and includes an input queue 304, micro service 308, and service level 306.

Timing between channels is also corrected for to ensure the different audio sources are synchronized with each other.

In many embodiments, the speech to text processing 200 is performed in real time in order to meet service level 306 requirements. During the initial pre-processing 202, the transcription may be done at less than real time speed. However, once the dictionaries are selected and processing commences, transcription speed will typically increase to obtain better than real-time conversion results.

Once pre-processing 202 has been completed task management is performed to ensure that each channel has adequate processing resources to obtain results as required by the service levels required for each application.

Figure 4:
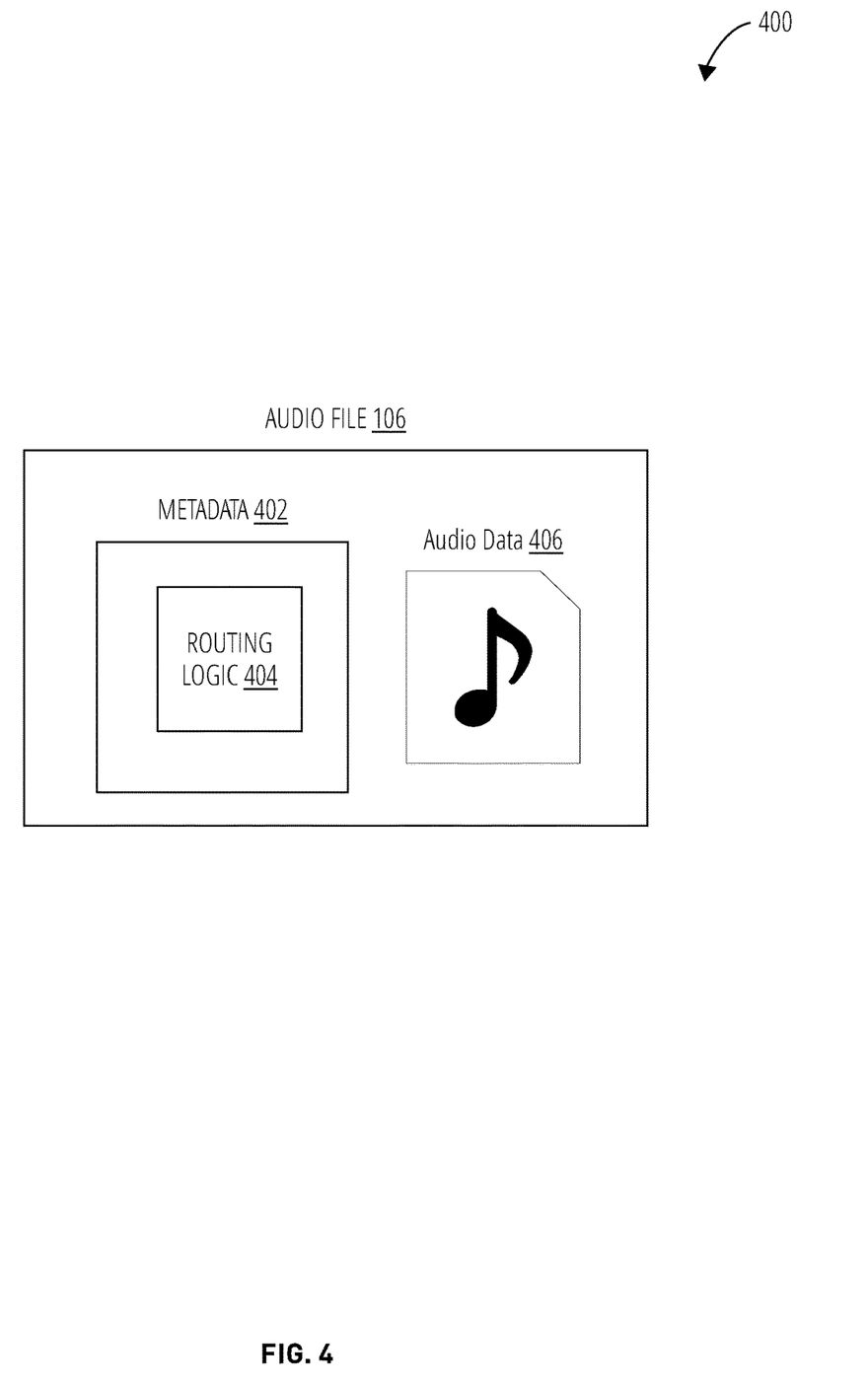
FIG. 4 illustrates an audio file with metadata 400 in accordance with one embodiment.

FIG. 4 illustrates the audio file 106 which comprises the digitized audio data 406 and is combined with metadata 402 that includes routing logic 404.

Figure 5:
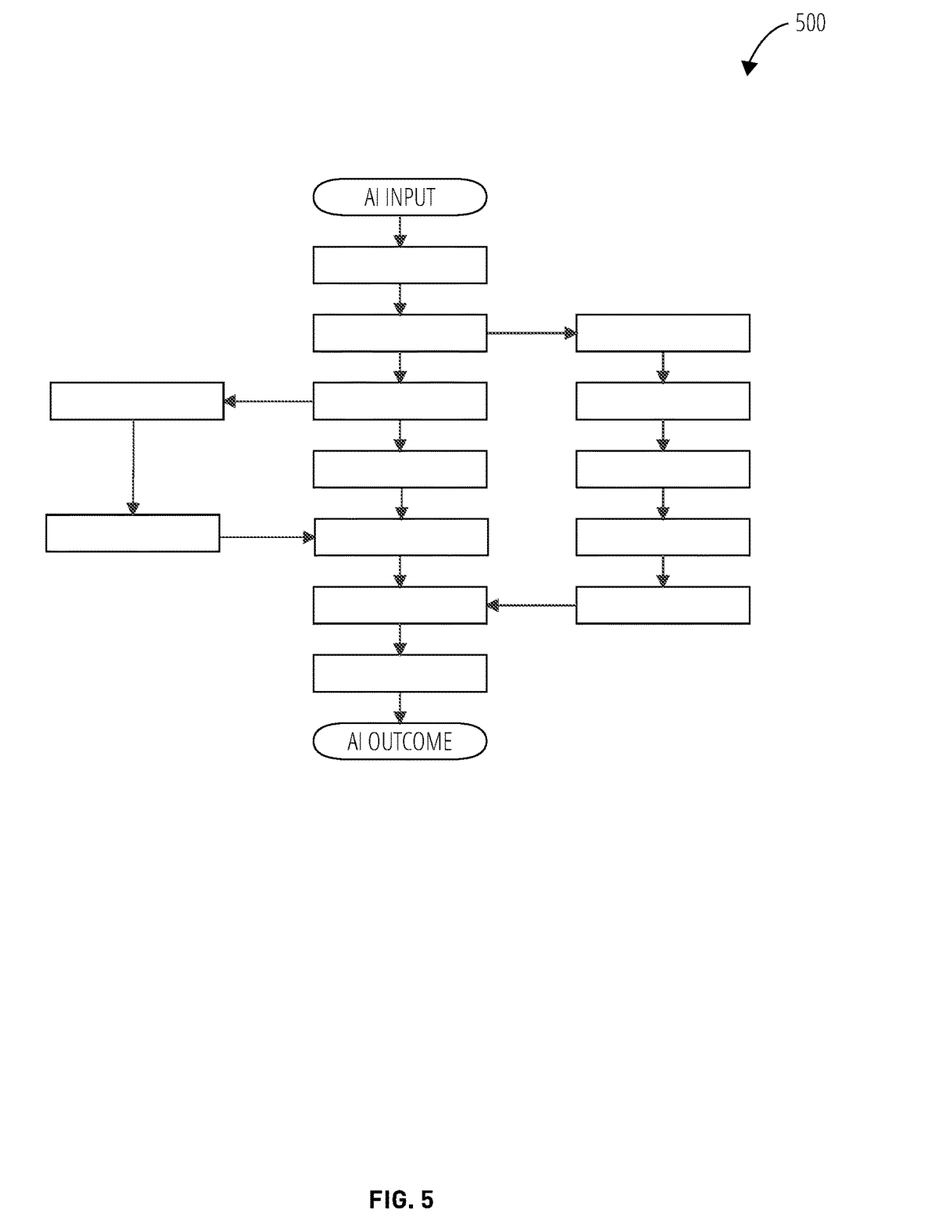
FIG. 5 illustrates a complex solution path 500 in accordance with one embodiment.

A routing engine is used to divide the audio to text processing into multiple parallel threads. Threads can be based on languages, dictionaries, etc. as recorded in the metadata of the audio file 106. Threads can also be determined by parsing the audio file 106 by sentences, pauses, and other time related aspects. The routing engine determines a number of parallel threads, with each parallel thread comprising a serial thread of one object 302 or several. FIG. 5 illustrates a complex solution path 500 with three parallel threads of varying numbers of serial processes.

Further embodiments may combine video and audio recordings to add enhanced information to the transcripts. Video recordings may include conventional video as well as video from a heat camera. Examples include determining a speaker's emotional state by detecting temperature of skin, blushing, and facial expressions. Enhanced information may also be used to add a truthfulness rating to statements made in transcripts.

The embodiments described herein provide the flexibility to adapt to new and different commercially available engines as well as process content to produce outcomes based on predetermined factors. Embodiments direct the management of millions of computing engines for the purpose of achieving a desired outcome in a specific amount of time. This same framework could be applied for the purpose of controlling a variety of devices or processes. Any variation which involves processing a given set of problems and harnessing as many computing engines as needed by the most efficient routing based on preset rules and most importantly learning from that solution so that that learning can be applied at the next attempt.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

What is claimed is:

1. A method of converting an audio recording to an evidentiary transcript, the method comprising:

receiving the audio recording from an input device, the audio recording comprising speech of a plurality of speakers;

transmitting the audio recording to a framework in a Cloud server;

extracting from the audio recording, a plurality of channels, each channel comprising recorded audio of one of the plurality of speakers;

selecting a corresponding characteristic of each of the plurality of channels;

for each channel of the plurality of channels in parallel:
  selecting, based on the corresponding characteristic, a respective Cloud-based commercial speech to text engine and a respective language dictionary from a plurality of different cloud-based commercial speech to text engines and a plurality of different language dictionaries on a plurality of Cloud-based servers;
  configuring the respective Cloud-based commercial speech to text engine with the respective language dictionary and executing a first conversion process to convert a first portion of the channel to produce a first transcript;
  evaluating a performance metric of the first conversion process against a quality metric;
  reconfiguring the respective Cloud-based commercial speech to text engine and/or the respective language dictionary based on the performance metric;
  executing a second conversion process to convert a second portion of the channel to produce a second transcript; and
  combining the first transcript and the second transcript into a final transcript; and synchronizing each of the final transcripts of the plurality of channels into the evidentiary transcript.

2. The method of claim 1 further comprising returning the evidentiary transcript from the framework for manual error detection by a stenographer; and returning the evidentiary transcript with corrections to the framework in the Cloud server providing a feedback loop to increase accuracy.

3. The method of claim 1 wherein reconfiguring the respective cloud-based commercial speech to text engine comprises using a different cloud-based commercial speech to text engine on the second conversion process.

4. The method of claim 1 wherein reconfiguring the respective cloud-based commercial speech to text engine comprises replacing the respective language dictionary with a different respective language dictionary for the second conversion process.

5. The method of claim 1 wherein the corresponding characteristic comprises a language.

6. The method of claim 1 wherein the corresponding characteristic comprises a language accent.

7. The method of claim 1 wherein the corresponding characteristic comprises an industry specific lexicon.

8. The method of claim 1 wherein the corresponding characteristic comprises a word or phrase used by an individual speaker.

9. The method of claim 1 wherein the quality metric is a latency between receiving the audio recording and producing the first transcript.

10. The method of claim 1 wherein the quality metric includes a number of misidentified words.

11. The method of claim 10 wherein the number of misidentified words comprise homophones.

12. The method of claim 1 wherein the reconfiguring of the respective commercial Cloud-based text engine comprises configuring a routing engine in the framework to manage a plurality of parallel processes including multiple parallel threads for executing the second conversion process.

13. The method of claim 1 wherein the performance metric comprises a result of a review of the first transcript by a stenographer.

14. The method of claim 1 further comprising determining an emotional state of at least one of the plurality of speakers from a video recording thereof;

wherein the evidentiary transcript comprises an indication of the emotional state of the at least one of the plurality of speakers.

15. The method of claim 1 further comprising providing an identification of one of the plurality of speakers with the corresponding characteristic.

16. The method of claim 15 wherein the identification of the one of the plurality of speakers is used to select the respective cloud-based commercial speech to text engine.

* * * * *